United States Patent
Cahalan et al.

(10) Patent No.: US 8,432,970 B1
(45) Date of Patent: Apr. 30, 2013

(54) BLOCK TYPE SELECTION

(75) Inventors: Timothy R. Cahalan, Austin, TX (US); Christopher T. Foulds, Austin, TX (US); Moinul H. Khan, San Diego, CA (US)

(73) Assignee: Marvell International Ltd. (BM)

( * ) Notice: Subject to any disclaimer, the term of this patent is extended or adjusted under 35 U.S.C. 154(b) by 1134 days.

(21) Appl. No.: 12/332,483

(22) Filed: Dec. 11, 2008

Related U.S. Application Data

(60) Provisional application No. 61/013,848, filed on Dec. 14, 2007.

(51) Int. Cl.
- H04B 1/66 (2006.01)
- H04N 7/12 (2006.01)
- H04N 11/02 (2006.01)
- H04N 11/04 (2006.01)

(52) U.S. Cl.
USPC ................................... 375/240.16

(58) Field of Classification Search .............. 375/240.16
See application file for complete search history.

(56) References Cited

U.S. PATENT DOCUMENTS

| | | | | |
|---|---|---|---|---|
| 5,646,618 A | * | 7/1997 | Walsh | 341/67 |
| 5,703,966 A | * | 12/1997 | Astle | 382/236 |
| 5,748,247 A | * | 5/1998 | Hu | 375/240.14 |
| 5,818,536 A | * | 10/1998 | Morris et al. | 375/240.15 |
| 5,832,234 A | * | 11/1998 | Iverson et al. | 709/247 |
| 6,542,549 B1 | * | 4/2003 | Tan et al. | 375/240.26 |
| 7,310,377 B2 | | 12/2007 | Wang et al. | |
| 7,342,964 B2 | | 3/2008 | Gallant et al. | |
| 7,421,025 B2 | | 9/2008 | Wang et al. | |
| 7,433,407 B2 | | 10/2008 | Lee et al. | |
| 7,702,020 B2 | * | 4/2010 | Gallant et al. | 375/240.16 |
| 7,720,151 B2 | * | 5/2010 | Itoh et al. | 375/240.16 |
| 2006/0008007 A1 | * | 1/2006 | Olivier et al. | 375/240.16 |
| 2006/0050786 A1 | * | 3/2006 | Tanizawa et al. | 375/240.03 |
| 2008/0212678 A1 | * | 9/2008 | Booth et al. | 375/240.16 |
| 2008/0291995 A1 | * | 11/2008 | Graham et al. | 375/240.02 |

OTHER PUBLICATIONS

Scalable High-Throughput Architecture for H.264/AVC Variable Block Size Motion Estimation Stephen Warrington, Wai-Yip Chan, and Subramania Sudharsanan 0-7803-9390-2/06/$20.00 © 2006 IEEE—ISCAS 2006.*

* cited by examiner

*Primary Examiner* — Edan Orgad
*Assistant Examiner* — James Turchen

(57) ABSTRACT

Devices, systems, methods, and other embodiments associated with block type selection are described. In one embodiment, a method calculates for each block from a set of M×N blocks that form a macroblock of image data, a first set of data. Adjacent blocks of the set of M×N blocks are combined into composite blocks. Data of the first set of data is selectively forwarded to composite blocks. For each composited block, a second set of data is calculated based, at least in part, on the forwarded data. A participation block is selected from one of the set of M×N blocks and the set of composite blocks based, at least in part, on the first set of data and the second set of data. The macroblock is compressed based on the participation block.

20 Claims, 9 Drawing Sheets

BLOCK TYPE SELECTION

CROSS REFERENCE TO RELATED APPLICATIONS

This application claims the benefit of U.S. provisional application Ser. No. 61/013,848 filed on Dec. 14, 2007 and is wholly incorporated by reference herein.

BACKGROUND

Video compression is used in a variety of current and emerging products. Video compression is used in digital television set-top boxes, digital satellite systems, high definition television (HDTV) decoders, digital versatile disk (DVD) players, video conferencing, and other digital video applications. Video compression allows images of video content to be compressed by removing non-essential features of the video content. Compressing video content reduces the storage area needed to store the content. Compressed video content may be transmitted faster than un-compressed video content.

There are a variety of video coding methods that compress digital video content. Video coding standards have been developed to standardize the various video coding methods so that the compressed digital video content is rendered in formats that video encoders and decoders can recognize. For example, the International Telecommunication Union (ITU) in cooperation with the International Standards Organization (ISO) has developed the MPEG-4 Advanced Video Coding (AVC)/H.264 standard. There are multiple manipulations of video content when compressing the video content with the H.264 standard. For example, the H.264 standard will operate on portions of an image known as macroblocks. Each macroblock may be a 16×16 array of pixels.

Macroblocks may be comprised of smaller block types. Smaller block types allow image data to be more precisely encoded than encoding image data with only macroblock granularity. For example, blocks smaller than the macroblock may be 4×4, 4×8, 8×4, 8×8, 8×16, and 16×8 arrays of pixels. A macroblock may be comprised of two or more of the smaller block types and may include different combinations of the smaller block types. For example, a 16×16 macroblock may be comprised of one 8×8, four 4×4 and one 8×16 block.

In order to determine the block types that are best for a macroblock, several cost values need to be computed. For example, in the H.264 standard a sum of absolute difference (SAD) and a motion vector (MV) cost value are calculated for each of 41 different block types. The SAD is calculated with respect to a reference image. If there is more than one MV in a reference area, then the SAD and the MV cost value need to be computed for each MV in the reference area for each of the 41 block types. These computations are numerous. A better way to select blocks types may be desirable.

SUMMARY

In one embodiment, a method calculates for each block from a set of M×N blocks that form a macroblock of image data, a first set of data. Adjacent blocks of the set of M×N blocks are combined into a set of composite blocks. Data of the first set of data is selectively forwarded to composite blocks of the set of composite blocks, where the forwarded data corresponds to the first set of data from the combined adjacent blocks of the set of M×N blocks. For each composited block of the set of composite blocks, a second set of data is calculated based, at least in part, on the forwarded data of the first set of data. A participation block from one of the set of M×N blocks and the set of composite blocks is selected based, at least in part, on the first set of data and the second set of data. The macroblock is compressed based on the participation block.

In another embodiment, an apparatus comprises partition logic to partition a macroblock into a set of M×N blocks of image data, where M represents a number of columns of pixels and N represents a number of rows of pixels, M and N being integers; composite block logic to combine adjacent members of the set of M×N blocks into members of a set of composite blocks; calculation logic to calculate, on a per member basis for members of the set of M×N blocks, a first image characteristic, a first motion vector, and a first cost value, where the first cost value for a selected M×N block is based on a corresponding first image characteristic and a corresponding first motion vector. The calculation logic is configured to calculate, on a per member basis for members of the set of composite blocks, a second image characteristic, a second motion vector, and a second cost value, where the second image characteristic, the second motion vector, and the second cost value for a selected composite block are based on corresponding image characteristics, motion vectors, and cost values of adjacent M×N blocks from which the selected composite block was formed; selection logic to select a participation member from either the set of M×N blocks or the set of composite blocks based, at least in part, on the first cost values associated with members of the set of M×N blocks and the second cost values associated with members of the set of composite blocks, where the participation member is used in a block type configuration of the macroblock.

In another embodiment, a method generates a set of complex blocks, where members of the set of complex blocks are based on one or more members of a set of building blocks, where the building blocks are arrays of pixels of image data. The set of building blocks and the set of complex blocks are combined to create a set of block types. A sum of absolute difference (SAD) is calculated for the members of the set of block types. A motion vector cost is calculated for members for the set of block types. A block cost is calculated for members of the set of block types based, at least in part, on the corresponding member SAD and motion vector cost. A participation member of the set of block types is then selected based, at least in part, on the block costs. A compressed macroblock image data is generated based on the participation member.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
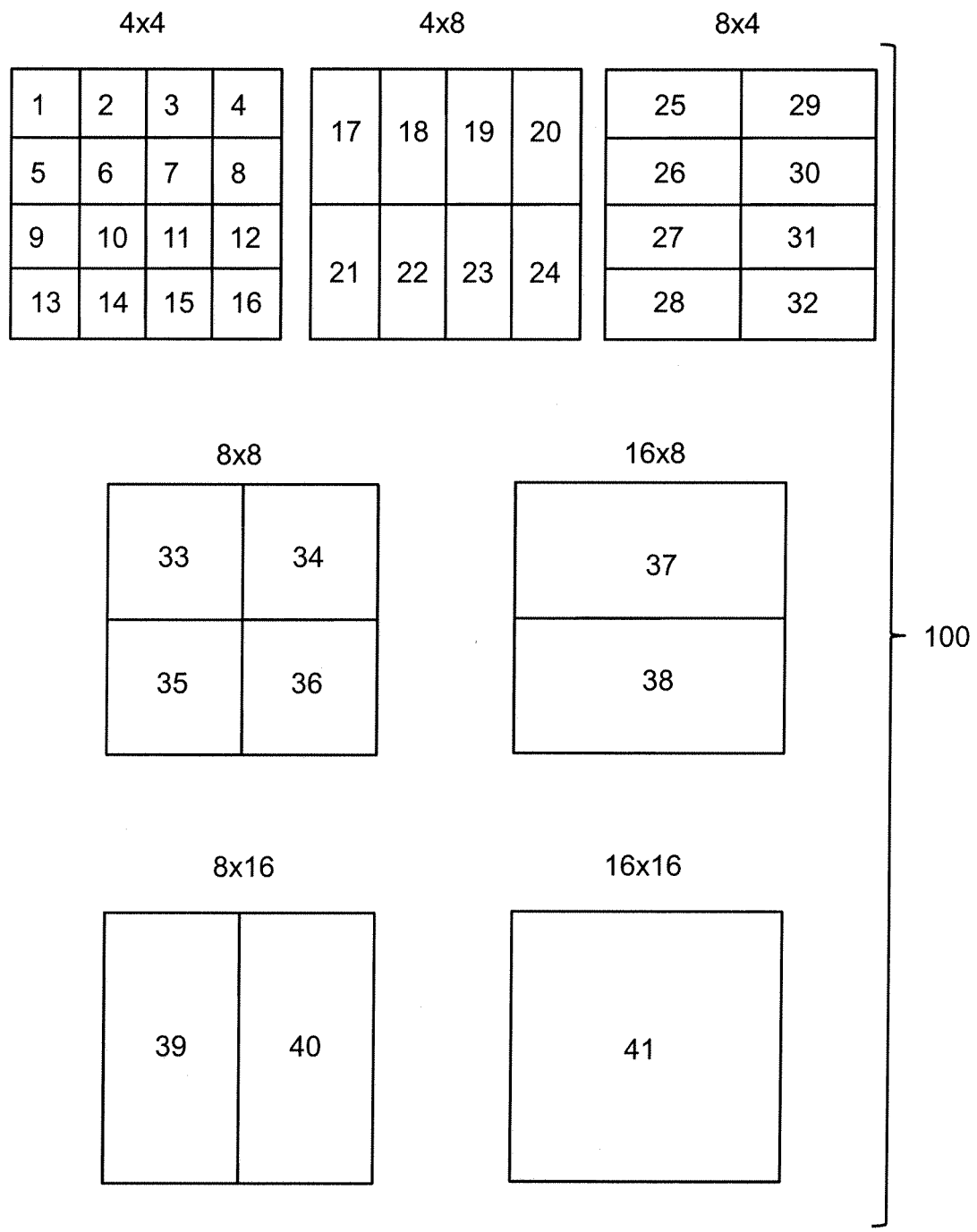
FIG. 1 illustrates one embodiment of block types associated with block type selection.

Described herein are example systems, methods, and other embodiments associated with block type selection. In one embodiment, basic block types of possible blocks that represent a macroblock may be determined first. With reference to FIG. 1, the block types may comprise 4×4, 4×8, 8×4, 8×8, 8×16, 16×8, and 16×16 blocks types. For example, the 4×4 block type is formed with sixteen 4×4 pixel arrays (e.g. labeled as blocks 1-16) from image data. Thus block "10" includes a 4×4 array of pixels. Similarly, block "28" in the 8×4 block type represents an 8×4 array of pixels. In one embodiment, the block types 100 may conform to the H.264 standard as shown in FIG. 1. For the following discussion, the 4×4 block type that is formed of sixteen 4×4 pixel arrays are referred to as the basic block types. The H.264 16×16 macroblock may be represented by the sixteen 4×4 basic block types. The 4×4 block types are the basic block types because the 4×4 block types may be combined to represent other larger block types. For example, two 4×4 block types may be combined to represent a 4×8 block type and eight 4×4 block types may be combined to represent a 16×8 block type.

In one embodiment, the basic block types are used to efficiently derive larger block types. A sum of absolute difference (SAD) and a motion vector (MV) cost may be calculated for basic block types. After the SAD and MV cost values are calculated for the basic block types, these values are used to efficiently calculate the SAD and the MV cost values for the larger block types. For example, once the SAD and the MV cost value for 4×4 basic block 1 and 5, of FIG. 1, are known, then the SAD and the MV cost of 4×8 block 17 are determined based on the SAD and the MV cost values of blocks 1 and 5.

In one embodiment, an apparatus combines adjacent members of a set of M×N basic blocks of image data of a macroblock into members of a set of composite blocks. The apparatus calculates, for members of the set of M×N basic blocks on a per member basis, a first set of data. After calculating the first set of data, the apparatus calculates, for members of the set of composite blocks on a per member basis, a second set of data. The second set of data of a specific composite block is based on members of the first set of data corresponding to adjacent M×N basic blocks from which the specific composite block was formed. The apparatus selects a block type to be used in a block type configuration. The block type is selected from the set of M×N basic blocks or from the set of composite blocks based, at least in part, on the first set of data and the second set of data.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an (application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software stored or in execution on a machine, and/or combinations of each to perform a function (s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Figure 2:
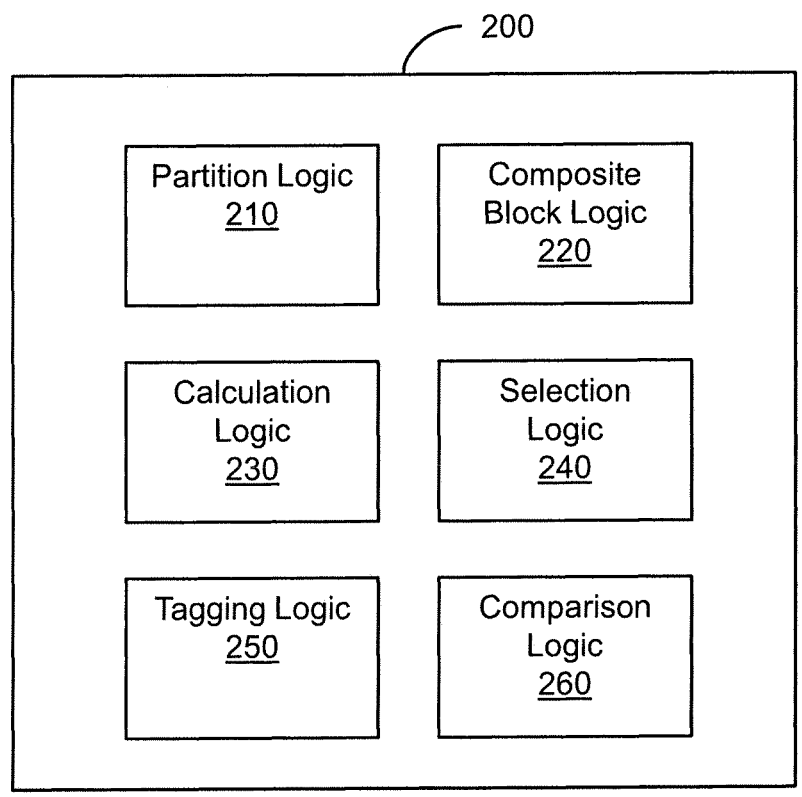
FIG. 2 illustrates an embodiment of an apparatus associated with block type selection.

FIG. 2 illustrates one embodiment of an apparatus 200 associated with block type selection. The apparatus 200 may be an integer motion estimation engine that determines the block types that will represent a macroblock of image data. In one embodiment, the apparatus 200 is implemented in a video encoder/decoder that encodes/decodes image data using the selected block types. The apparatus 200 calculates a sum of absolute difference (SAD) and a motion vector (MV) cost for each basic block type. In one embodiment, the macroblock may be an H.264 macroblock representing 256 pixels in a 16×16 array and the basic block may be a 4×4 block of pixel data. After the SAD and MV cost values are calculated for the basic block types, the SAD and the MV cost values for the larger block types are calculated based on the SAD and MV cost values of the basic block types. The apparatus 200 may calculate the SAD and MV cost values of the 41 block types of the H.264 standard in parallel. The apparatus 200 determines a block type that is suitable to encode the macroblock image data based, at least in part on the SAD and MV cost values of the 41 block types.

In one embodiment, the apparatus 200 comprises partition logic 210 to partition a macroblock into a set of M×N blocks of image data. M represents a number of columns of pixels and N represents a number of rows of pixels. M and N are integers. In one example, the macroblock is 16×16 and M×N is 4×4 so that there are 16 M×N basic blocks of data as shown by blocks 1 through 16 of FIG. 1.

Figure 3:
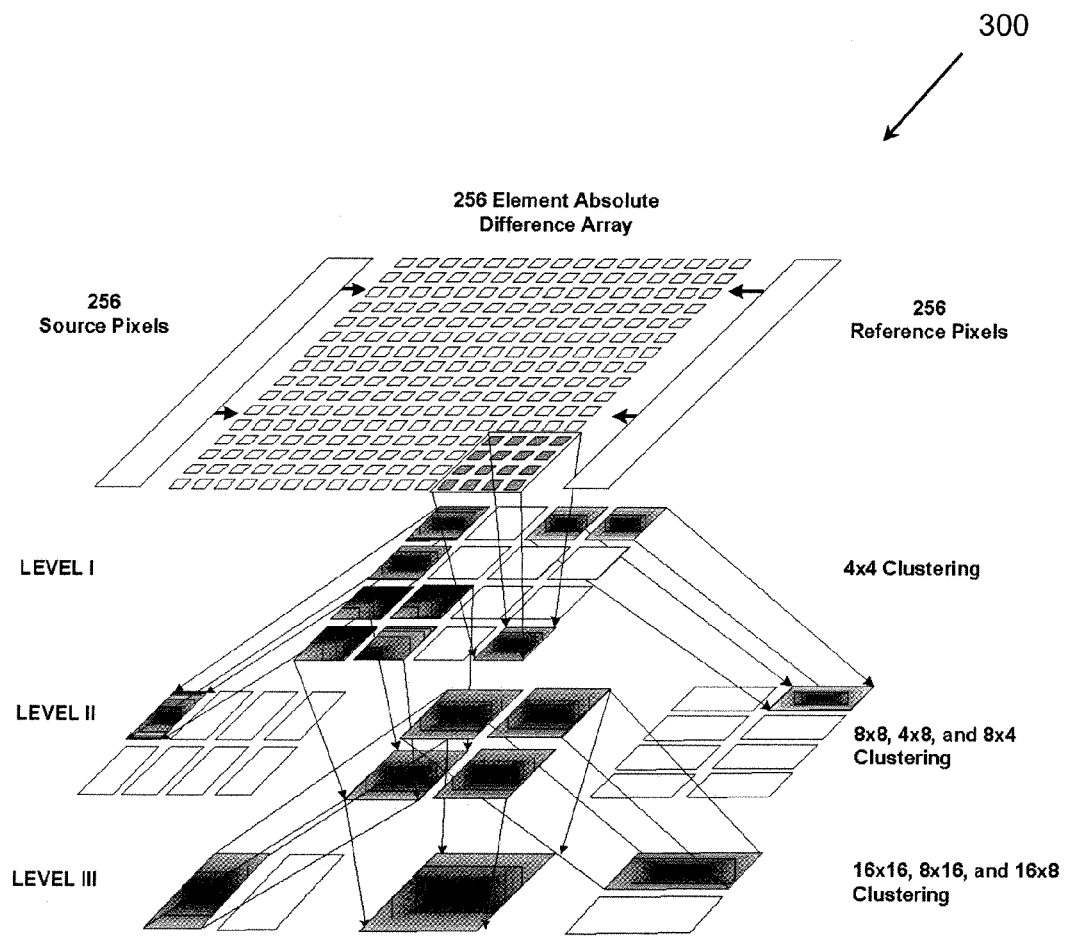
FIG. 3 illustrates another embodiment of block types associated with block type selection.

The apparatus 200 comprises composite block logic 220 to combine adjacent members of the set of M×N blocks to generate a composite block. Multiple composite blocks are referred to as a set of composite blocks. For example with reference to FIG. 1, the composite block logic 220 is configured to combine adjacent M×N blocks from the 4×4 block type to generate block types 17 through 41. For example, the composite block logic 220 can combine blocks 3, 4, 7, and 8 to form a composite block type 34. In another example, the composite block logic 220 may combine blocks 9, 10, 11, 12, 13, 14, 15, and 16 to form a composite block type 38. The block types may be the H.264 standard block types. FIG. 3 shows another representation of how the 4×4 (M×N) basic blocks may be combined to form composite blocks. Even though the H.264 standard is used in examples in this specification, those of ordinary skill in the art will realize the embodiments and examples within this specification may be used with other image encoding and decoding standards with different numbers of block types and with different numbers of blocks.

Using smaller blocks to encode image data results in more image detail being encoded than when encoding using larger blocks. However, small blocks generate more data because a motion vector needs to be encoded with small blocks. Large blocks encode image data with less data than small blocks because large blocks use fewer motion vectors. In addition to using more motion vectors when encoding into smaller blocks, there is additional overhead data that is used to specify the smaller blocks and the orientation of the smaller blocks. This overhead may increase the transmission time of encoded data that is transmitted with smaller blocks than larger blocks.

With further reference to FIG. 2, the apparatus 200 comprises calculation logic 230. The calculation logic 230 calculates, on a per member basis for members of the set of M×N blocks, a first image characteristic, a first motion vector, and a first cost value. Once the first image characteristics, the first motion vectors, and the first cost values of the M×N blocks are calculated, this information may be used by the calculation logic 230 to calculate, on a per member basis for members of the set of composite blocks, a second image characteristic, a second motion vector, and a second cost value.

In another embodiment, the calculation logic 230 can be configured to calculate the first image characteristic and the second image characteristic using a mean absolute difference (MAD) of pixel values or a sum of absolute differences (SAD) of pixel values, or a combination of both. The MAD and SAD may be calculated with respect to the pixel data of a reference frame of image data. Those of ordinary skill in the art will appreciated that, in addition to the MAD and/or SAD calculations, other calculations may be used to determine the first and second image characteristics.

Referring to FIG. 1, blocks 1 to 16 are the blocks with the lowest granularity and would correspond to the M×N blocks. The SADs of the set of composite blocks (blocks 17-41 in FIG. 1) may be calculated by combining the SADs of the lowest granular block. For example, the SAD of block 10 will contribute to the SAD of blocks 22, 27, 35, 38, 39, and 41. The MV costs may also be calculated by using motion vectors of contributing granular blocks.

The first and second image characteristics may indicate how closely the image pixels of the corresponding block type compare to the image pixels of a reference frame. The first and second MV costs may indicate how the movement of image pixels of a block type compares to the image pixels of a reference frame. For example, a MV cost of (1,0) may indicate an image of pixels has moved upward by one pixel from the reference frame (e.g. positive MV direction is down and to the right when viewing FIG. 1). The first and second cost values indicate a total cost value of a block type based on the corresponding first or second characteristic and MV cost values.

In one embodiment as previously described, the set of M×N blocks and the set of composite blocks comprise a set of block types. For example, the block types may be the 41 H.264 block types illustrated in FIG. 1 as blocks 1-41. Correspondingly, the apparatus 200 of FIG. 2 can be configured with a set of 41 accumulators to accumulate values associated with the set of 41 block types. There is a one to one correspondence between the set of 41 block types and the set of 41 accumulators. The accumulators may accumulate the image characteristics, the motion vectors, and the cost values. Of course, if there are different numbers of block types, different numbers of accumulators can be used.

In one embodiment, the calculation logic 230 calculates the first cost value according to:

first cost value=(lambda)×(the first motion vector)+
(the first image characteristic), where lambda is a scaling value set externally. The calculation logic 230 may calculate the second cost value according to:

second cost value=(lambda)×(the second motion vector)+(the second image characteristic).

Based on the disclosure and teachings provided herein, those of ordinary skill in the art will realize that the cost values may be calculated with equations other than those listed here.

The apparatus 200 comprises selection logic 240 to select a participation member from either the set of M×N blocks or the set of composite blocks. The selection is based, at least in part, on the first cost values associated with members of the set of M×N blocks and the second cost values associated with members of the composite blocks. The participation member participates in a block type configuration of the macroblock.

In one embodiment, the selection logic 240 selects a set of block types to represent a macroblock based on the first and second cost values. For example, the selection logic 240 may select block types 1, 2, 5, 6, 29, 30, and 38 to represent a macroblock. In another embodiment, the selection logic 240 may select a block type to represent a portion of a macroblock and then the calculation logic 230 will recalculate the cost values before another block type is selected to participate with the prior block type in representing the macroblock. In one embodiment, the apparatus 200 comprises tagging logic 250. The tagging logic 250 tags members of the set composite blocks to participate in the block type configuration.

In one embodiment, the calculation logic 230 calculates the first motion vector and the second motion vector based, at least in part, on a first reference point. The first reference point may be an offset to a given predicted motion vector of a current search point. The location of the first reference point for the members of the set of M×N blocks corresponds to the location of the first reference point for the members of the set of composite blocks. In some embodiments, the first reference point is in the top left corner of members of the set of M×N blocks. The first reference point may be in the top left corner of members of the set of composite blocks.

Figure 4:
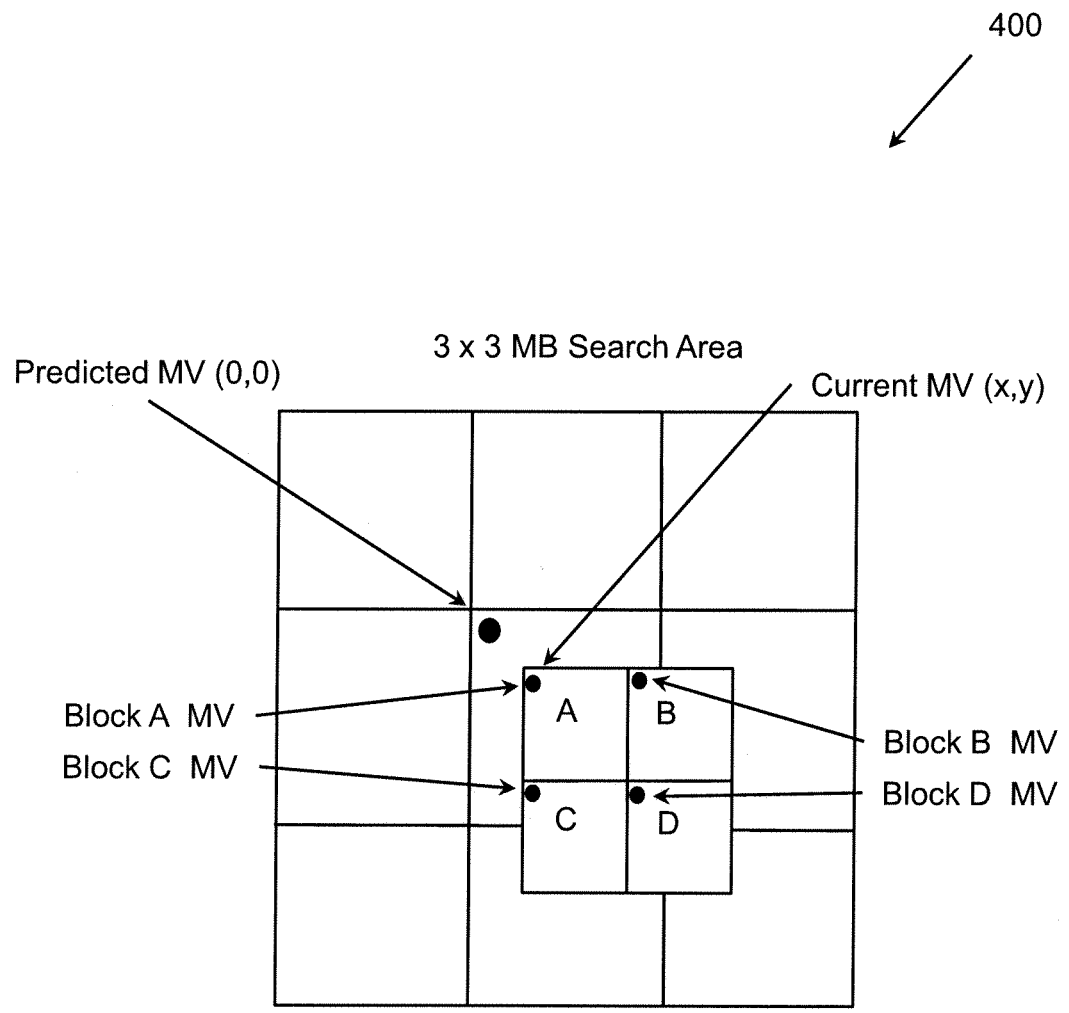
FIG. 4 illustrates one embodiment of motion vectors associated with block type selection.

In one embodiment, there may be more than one motion vector for each block type. FIG. 4 shows one example of the locations of the motion vectors of interest for blocks A, B, C, and D. The predicted MV may be the upper left corner (0,0) starting point in the search area. For each MV in the search area, the block types are processed with a MV relative to the current MV. In one embodiment, there will be offsets for each block type based on its relative location to the top left corner of the macroblock, e.g. the B, C, and D motion vectors in FIG. 4 will be different from A, names +4 or 8 in either horizontal or vertical direction, or both directions.

The example in FIG. 4 shows a block type configuration of four 8×8 blocks. Before arriving at the four 8×8 blocks, the 41 block type costs are calculated in the four MVs in the search area. For MVs in the search area the cost values are compared to a previous minimum cost value and the minimum is retained as the cost value for block type. The block selection logic 240 compares the cost values of the 41 block types to determine the optimal block type configuration after the MVs of interest have been processed for the 41 block types. For the example block type configuration shown in FIG. 4, there will be four block SAD costs plus four MV costs that will contribute to the block type configuration.

In one embodiment, the calculation logic 230 calculates separate sets of values for one or more motion vector reference points in a search area. The values calculated may be a first image characteristic, a first motion vector, and a first cost value. The values may be calculated for members of the set of M×N blocks, on a per member basis and on a motion vector reference point basis. For example, if there are three MVs, then the first image characteristic, the first motion vector, and the first cost value will be calculated for each of the motions vectors for each of M×N blocks.

The calculation logic 230 also calculates, for the one or more motion vector reference points in a search area, the second image characteristic, the second motion vector, and the second cost value. These values are calculated for members of the set of composite blocks, on a per member basis and on a per motion vector reference point basis. The apparatus 200 comprises comparison logic 260 to select the lowest first cost value on a per member basis and to select the lowest second cost value on a per member basis. For example, if there are three motions vectors, then the lowest of the three first cost values is selected for each member of the set of M×N blocks. The lowest of the three second cost values is selected for each member of the set of composite blocks.

Apparatus 200 may be embodied in different forms and may perform various functions. For example, the apparatus 200 may be implemented in a chip. A chip is a set of microminiaturized electronic circuits fabricated on a semiconductor material. In one embodiment, the apparatus 200 partitions the macroblock and selects the participation member to participate in a block type configuration of the macroblock in one clock cycle. The apparatus 200 may be H.264 compliant.

Selecting blocks according to some of the embodiments described above provide an improved technique of encoding image data. Table 1 compares three approaches of selecting a block type. It will be appreciated that the example values shown in Table 1 are for explanatory purposes only and are not to limit any implementation. The example values are from previous experiences and comparisons, and may change in view of the system on which the comparisons are made. Referring to Table 1, the first approach checks just two of the 41 block types. The first approach will always select one of the two 4×8 block types and select one of these block types for encoding the image data. The second approach will check all 41 block types and select one for encoding the image data. The second approach will not propagate the SAD or motion vector costs of the lowest granular blocks to the larger blocks. The second approach fully cycles through the block selection process 41 times calculating SAD and cost value for a different block each cycle through the block selection process. The parallel approach shares SAD and motion vectors costs as discussed above.

TABLE 1

| Approach | Block Types Checked | Normalized Reference Pixels Fetched | Normalized Area Estimate | Normalized Encoding Quality |
|---|---|---|---|---|
| First | 2 | 1.0 | 1.0 | 1.0 |
| Second | 41 | 7.0 | 1.05 | 1.5 |
| Parallel | 41 | 1.0 | 1.2 | 1.45 |

The second approach has the highest encoding quality. However, this quality may come at the expense of the speed of encoding. The second approach reads more pixels from memory than the other two approaches. A chip implementing the second approach may be slower than a chip implementing either of the other approaches. The parallel approach has nearly the encoding quality as the second approach. The chip implementing the parallel approach may have a die area greater than the second approach because of the additional circuits used to calculate SAD and motion vector values in parallel. The first approach has a speed similar to the parallel approach but has greatly reduced encoding quality. The parallel approach of the above embodiments may be the optimal solution because the speed and quality are high while the die area is only increased about 20%.

Figure 5:
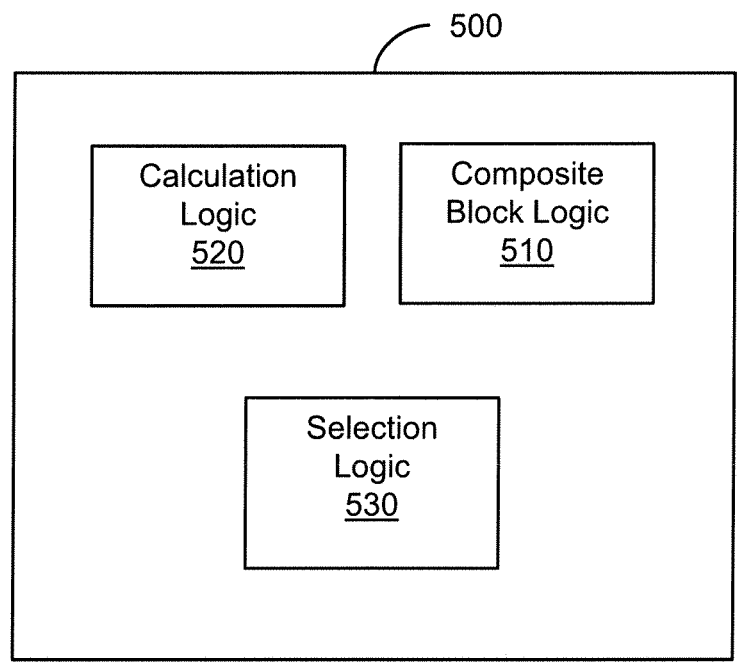
FIG. 5 illustrates another embodiment of an apparatus associated with block type selection.

Another embodiment for selecting a block type is shown in FIG. 5. Apparatus 500 is similar to the apparatus 200 shown in FIG. 2 except without the partition logic 210. In one embodiment, the apparatus 500 includes a composite block logic 510, a calculation logic 520, and a selection logic 530 that are configured to provide functions as described with reference to method 600 shown in FIG. 6. Method 600 is described below.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 6:
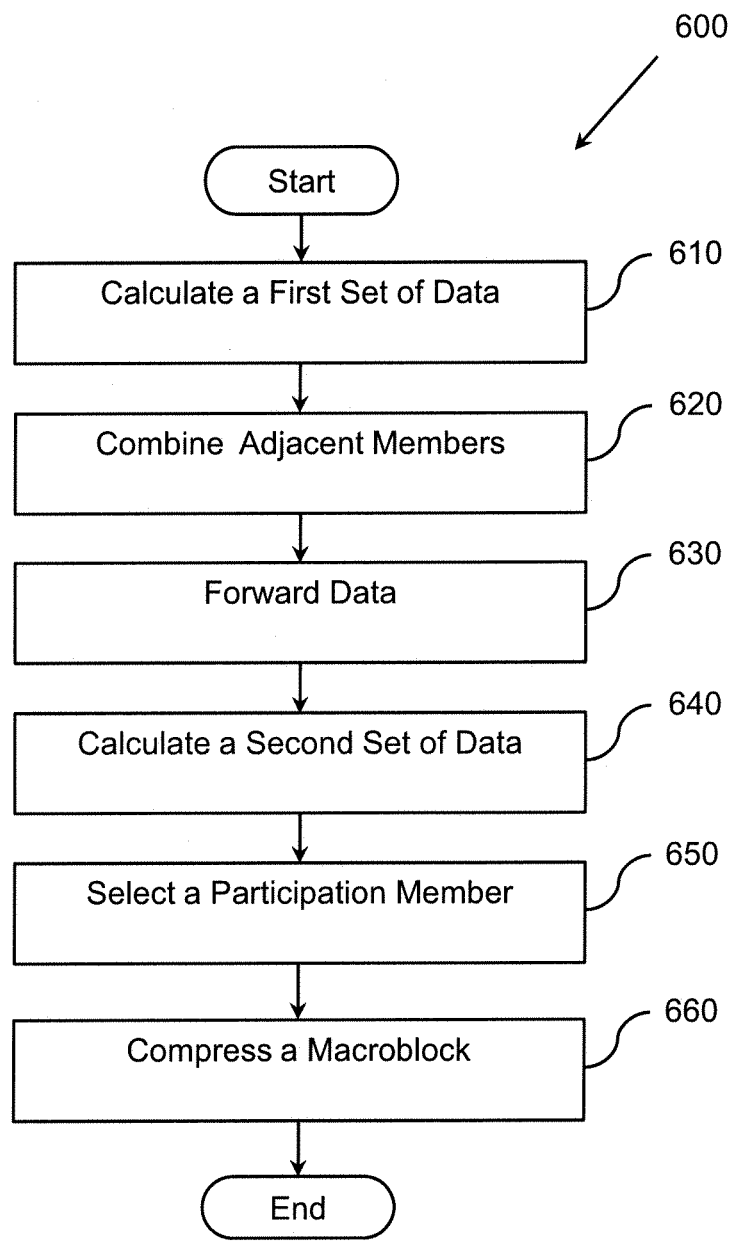
FIG. 6 illustrates one embodiment of a method associated with block type selection.

FIG. 6 illustrates one embodiment of an example method 600 associated with selecting a block type. It will be appreciated that apparatus 200 of FIG. 2 and/or apparatus 500 of FIG. 5 can be implemented to provide functions equivalent to the process of method 600. Various forms of logic, for example a circuit, can also be implemented to perform the process of method 600. The method 600 improves selecting a block type for encoding/decoding an image/video by passing data from the smallest blocks to the larger blocks in order to reduce the amount of block data computed. The method 600 calculates, at 610, on a per block basis for each block of a set of M×N blocks, a first set of data (e.g. an image characteristic, a motion vector, and a cost value). The M×N blocks are associated with a macroblock of image data to be encoded/decoded. There is a one to one correspondence between each block of the set of M×N blocks and a first set of data. The M×N blocks may be 4×4 blocks. The 4×4 blocks may be arrays of 16 pixel values.

The method 600, at 620, combines adjacent blocks of the set of M×N blocks into a composite block. Multiple composite blocks formed from other adjacent M×N blocks form a set of composite blocks. The set of M×N blocks and the set of composite blocks may comprise a set of 41 blocks. The set of 41 blocks may be a set of H.264 block types. The method 600 selectively forwards data from the first set of data to composite blocks of the set of composite blocks at 630. The forwarded data of the first set of data correspond to the data calculated from the combined adjacent members of the set of M×N blocks. In one embodiment, the term "forwarding" refers to passing the data to another component (e.g. one portion of a circuit forwards the data to another portion). The set of composite blocks and the set of M×N blocks may be combined to form a set of block types.

The method 600, at 640, calculates for each composite block of the set of composite blocks, a second set of data. The second set of data is based, at least in part, on the forwarded data of the first set of data. In one embodiment, the first set of data comprises a first image characteristic, a first motion vector, and a first cost value, which are determined based on the pixel values of the M×N blocks. The second set of data comprises a second image characteristic, a second motion vector, and a second cost value, which are determined based on the pixel values of the composite block. In one embodiment, the first image characteristic and the second image characteristic are a SAD of pixel values as previously described.

As discussed above, the set of M×N blocks are block types with the lowest granularity that may be used to encode the macroblock. The SADs of the set of composite blocks are calculated by combining the SADs of the M×N granular blocks. For example, the SAD of block 10 of FIG. 1 will contribute to the SAD of blocks 22, 27, 35, 38, 39, and 41. The motion vector costs may also be calculated by using contributing granular blocks motion vector cost values in this way.

A participation member is selected at 650, which will be used to compress the macroblock. The participation member is either a block from the set of M×N blocks or a composite block from the set of composite blocks. The participation member selection is based, at least in part, on the first set of data and the second set of data. In one embodiment, the motion vector of a block of the set block types may be scaled on a per block basis. The scaled motion vectors are then added to the SADs of the blocks of the set of block types on a per block basis to produce cost values. The participation member is then selected based on the cost values. In one example, the selected participation member is a block type that has a minimum encoded cost for MVs in the search area.

In one embodiment, more than one participation member may be selected. For example, blocks 1, 2, 5, 6, 29, 30, and 38 of FIG. 1 may be selected as participation members to represent the macroblock. In another embodiment, after a participation member is selected to represent a portion of a macroblock, the set of first data, the set of second data, and the cost values are recalculated before another block type is selected.

The macroblock is compressed based on the participation member at 660 (e.g. encoding digital video). The compression may be performed according to the H.264 standard or another suitable standard as would be appreciated by one of ordinary skill in the art. The compression may be performed according to a single participation member or a set of participation members.

In one embodiment, the first motion vector is calculated using a first reference point as an offset to a given predicted motion vector of a current search point. The second motion vector is calculated using the first reference point as an offset to the given predicted motion vector of the current search point. The first reference point is in a first location for each M×N block of the set of M×N blocks. For example, this means the reference point may be in the top left corner in each block of the set of M×N blocks. The reference point is also in the first location on a per block basis for composite blocks of the set of composite blocks. For example, this means the reference point may be in the top left corner for each member of the set of composite blocks. In another embodiment, the first and the second motion vectors are calculated with the first reference point in the top left corner of a block of the set of M×N blocks and in the top left corner of a composite block of the set of composite blocks.

In some embodiments, the method 600 is implemented in an image compression chip. The image compression chip is a set of micro-miniaturized electronic circuits fabricated on semiconductor material. The image compression chip may be H.264 compliant.

Figure 7:
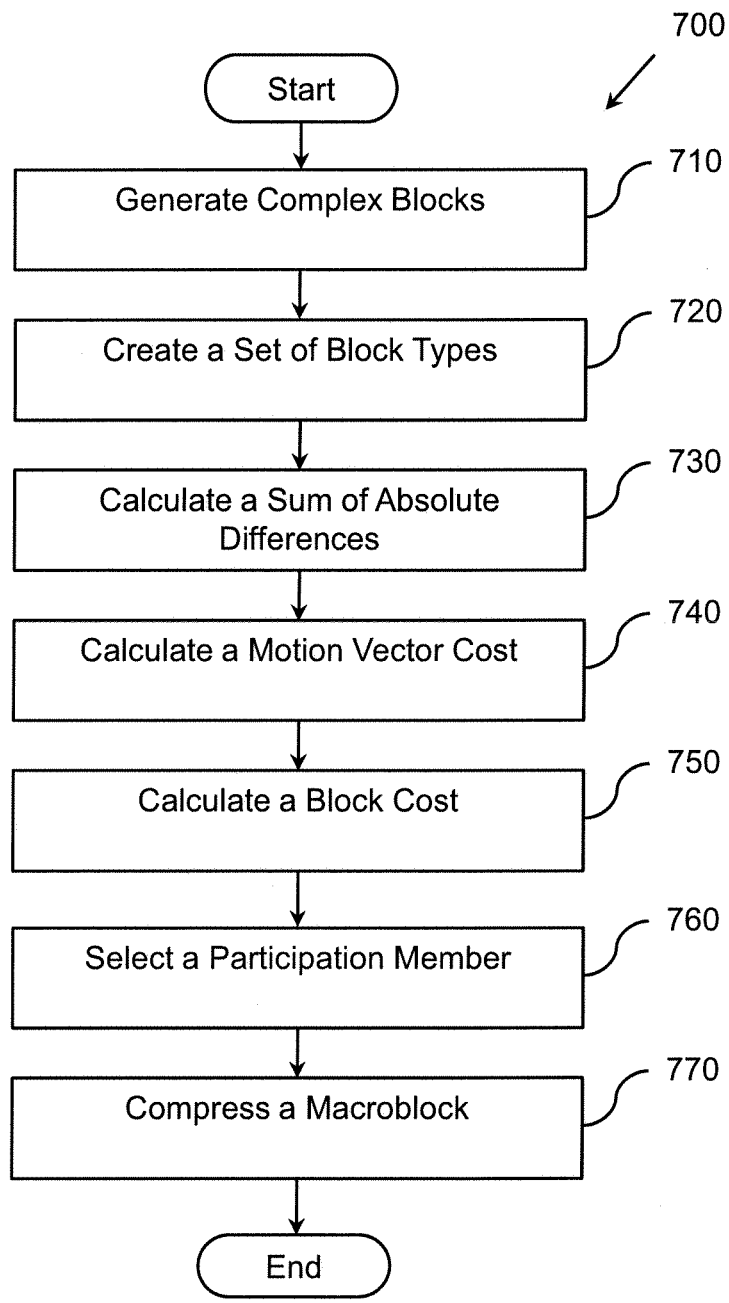
FIG. 7 illustrates another embodiment of a method associated with block type selection.

FIG. 7 illustrates another embodiment of a method 700 associated with selecting a block type. It will be appreciated that apparatus 200 of FIG. 2 and/or apparatus 500 of FIG. 5 can be implemented to provide functions equivalent to the process of method 700 or other methods described herein. The method 700 improves selecting a block type by passing data from the smallest blocks to the larger blocks in order to reduce the amount of block data computed. The method 700 generates, at 710, a set of complex blocks. The members of the set of complex blocks are based on one or more members of a set of building blocks. It will be appreciated that a member of a set is one object from the set. Thus a member of the set of complex blocks refers to one complex block from the set. In one embodiment, the set of building blocks may be the sixteen 4×4 H.264 block types. The method 700 combines the set of building blocks and the set of complex blocks to create a set of block types at step 720. The set block types may comprise the forty one H.264 block types.

A SAD is calculated, at 730, for the members of the set of block types on a per member basis. For example, this means that on a per member basis a SAD value is calculated for members of the basic blocks and then these values are used to calculate SAD values for the members of the set of complex blocks. A motion vector cost is calculated, at 740, for members for the set of block types on a per member basis. In one embodiment the motion vector cost depends, at least in part, on a first reference point as an offset to a given predicted motion vector of a current search point. Based on the corresponding member SAD and the motion vector cost, a block cost is calculated, at 750, for members of the set of block types on a per member basis. In some embodiments, other types of values may be calculated. The other values may indicate how well a member of the set of block types represents a reference image.

A participation member is selected at 760. The participation member is selected from the set of block types based, at least in part, on the block costs. At 770, a compressed macroblock image data is generated based on the participation member. As discussed above, more than one participation member may be selected. The compressed macroblock image data is then generated based on the selected participation member(s). In one embodiment, members of the set of block types are tagged. The tagging allows the tagged members of the set blocks to be selected as the participation member. Non-tagged blocks are not selected. The tagging is performed as part of block 730 before the calculation of the SAD. The SAD, motion vector cost, and block cost are not calculated for non-tagged members of the set of block types which saves computation time and resources. In one embodiment, a member of the set of block types is tagged by writing an indication to a block type status table indicating that the block type is tagged.

In one embodiment, the motion vector cost and the block cost are calculated on a per member basis for the set of block types for one or more reference vectors. This means that a block will have a motion vector cost and a block cost calculated for each reference vector. The lowest block cost is selected for each member of the set of block types. If there are three reference vectors, for example, then three cost values may be calculated for each member of the set of block types. The lowest cost value of each of the three members will be selected for each member of the set of block types.

In one embodiment, the complex blocks generated at 710 are generated from a current macroblock of image data. Thus a current macroblock is loaded before the generating. Method 700 can also be iterated with the next macroblock. The method 700 may extract the set of building blocks from the current macroblock. The set of building blocks is extracted by reading data within the current macroblock that indicates the granularity of the members of the set of building blocks. Extracting the set of building blocks from the current macroblock may allow the building blocks to be of a larger granularity than when the building blocks are based on a smaller standard granularity. The SAD, motion vector cost, and block costs of larger blocks are processed faster than for smaller blocks. Images encoded in larger blocks can be transmitted faster than images encoded in smaller blocks. The current macroblock, in another embodiment, is an H.264 macroblock of image pixels. The method 700 may extract members of the set of building blocks from the current macroblock. The members of the building blocks may be 4×4 arrays of sixteen pixels.

In one embodiment, the motion vector cost and the block cost for members of the set of block types on a per member basis are stored in a memory. The storing is performed after the motion vector costs and the block costs are calculated in blocks 740 and 750. In one embodiment, the SAD values are stored into a set of accumulators. The SAD values are stored after the SAD values are calculated in block 730. Storing the SAD values, motion vector costs, and the block costs allows these values to be compared to subsequently calculated SAD values, motion vector costs, and block costs as discussed below with reference to FIG. 8. There is a one-to-one correspondence between the individual block types of the set of block types and individual accumulators of the set of accumulators.

In another embodiment, a reference pixel area is loaded prior to the calculation of the SAD in block 730. The SAD may be a sum of absolute differences with respect to the reference pixel area.

In one embodiment, the block cost is calculated according to:

$$block\ cost = (lambda) \times (motion\ vector\ cost) + SAD,$$

where lambda is a scaling factor.

In some embodiments, the method 700 is performed in a chip in one clock cycle and is H.264 compliant. A chip is a set of micro-miniaturized electronic circuits fabricated on a semiconductor material.

Figure 8:
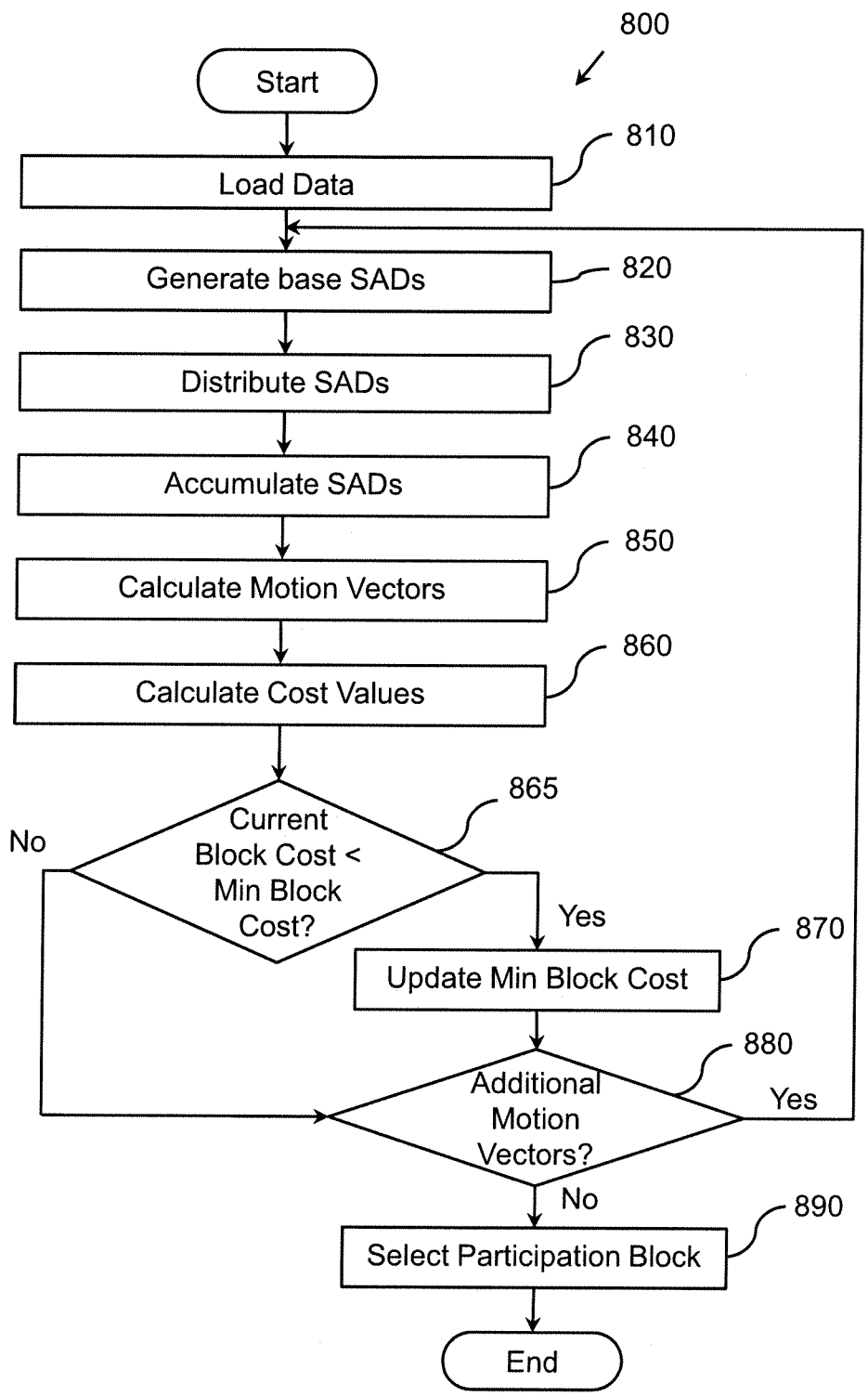
FIG. 8 illustrates another embodiment of a method associated with block type selection.

FIG. 8 illustrates another embodiment of a method 800 associated with block type selection for encoding/decoding digital images/videos. The method 800 involves determining for members of a set of block types a cost value. The smallest cost value is selected for members of the set of block types. One of the members of the set of block types is selected to participate in the encoding of an image based on the smallest cost value.

The method 800 begins by loading a current macroblock of pixel data and reference pixel data at 810. The reference pixel data may be a reference search area of pixel data. For example, the reference pixel data may be a previous image frame, N-1. The current pixel data is the most recent pixel data from an input (e.g. from a camera) and the reference pixel data will from input N-1 or N-#. The SAD is calculated from the difference between blocks in these frames. The current macroblock of pixels and the reference pixel data may be images taken straight from a camera.

Base SADs are generated at 820. The base SADs may be the SADs for the H.264 sixteen 4×4 blocks of pixel values. The base SADs are distributed to the composite blocks at step 830. The composite blocks may be H.264 block types 17 through 41 of FIG. 1. The SADs are accumulated at 840. The SADs of the block types may be accumulated in parallel in a set of accumulators with a one to one correspondence between a SAD value and an accumulator of the set of accumulators. The method 800 calculates, at 850, motion vectors for the block types. Cost values of the block types are calculated at 860. The SADs, motion vectors, and cost values may be calculated by the methods discussed above. Those of ordinary skill in the art will appreciate that other values may be calculated and that other cost values may be computed to indicate how well a block type may encode an image.

The method 800 determines, at 865, whether a current cost value is less than a minimum cost value. The determination, at 865, is performed for the set of block types on a block by block basis. This determination, at 865, is performed between the minimum cost value and the new cost value of a different reference motion vector. If the current block cost is less than the minimum block cost, then the minimum block cost is updated with the current block cost at 870.

If the current block cost is not less than the minimum block cost, then a decision is made, at 880, to determine if there are any more motion vectors in the reference area. When there are additional motion vectors, the flow returns to generate the base SAD values for the next motion vector at 820. The method 800 continues to generate the SADs, generate block motion vectors, generate cost values, and update the current block cost values for each block type of the set of block types. This process is completed for motion vectors in the reference area. In one example, the motion vectors are computed until no motion vectors are left in the reference area. When there are no more reference area motion vectors in the search area, a participation block is selected at 890. The participation block is a block type from the set of block types. The participation block will participate in the encoding of the macroblock as discussed above.

It will be appreciated that in one embodiment, the methods herein may be implemented as computer executable instructions embodied and stored on a computer-readable medium. When executed by a machine (e.g., processor, device) the instructions cause the machine to perform the methods herein and their equivalents. The methods can also be implemented with circuits.

Figure 9:
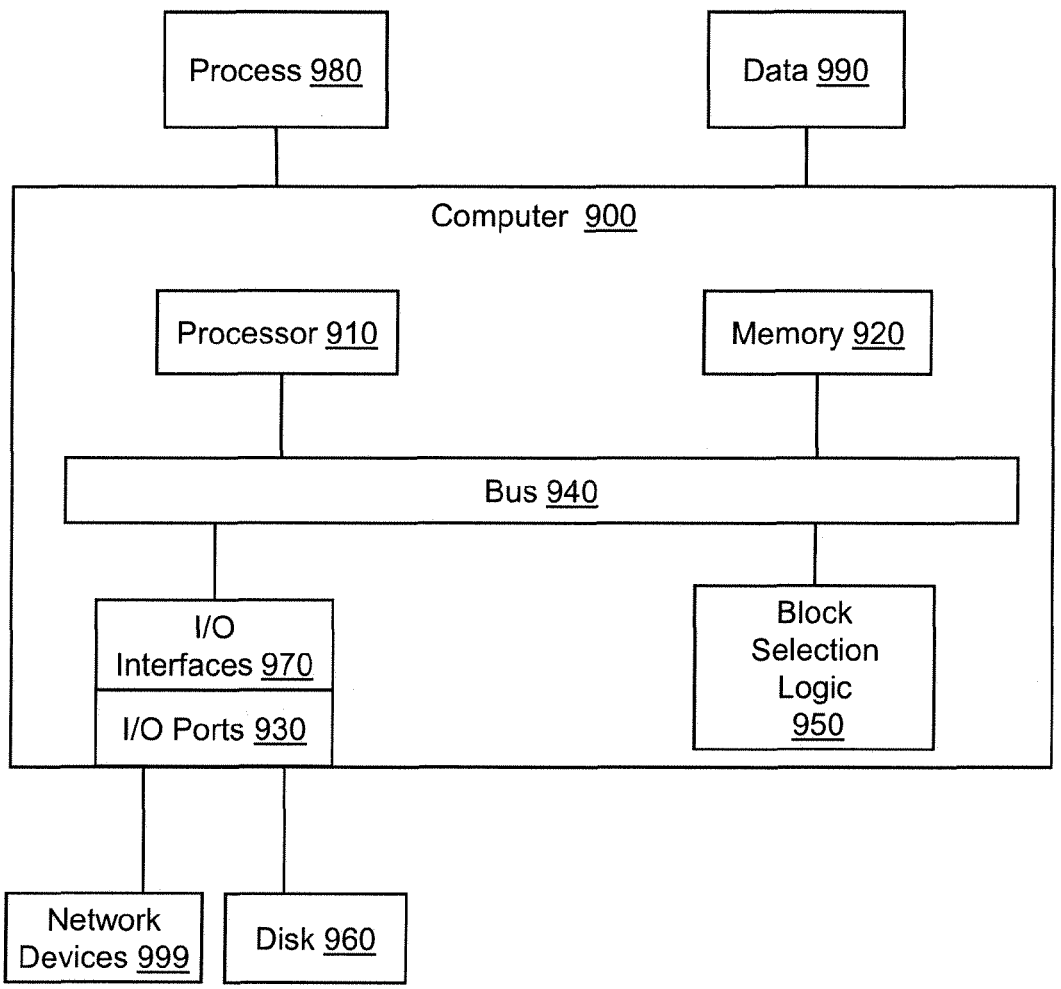
FIG. 9 illustrates an embodiment of a computing environment in which example systems and methods, and equivalents associated with block type selection may be implemented.

FIG. 9 illustrates an example computing device in which example systems and methods described herein, and equivalents, may be implemented. The example computing device may be a computer 900 that includes a processor 910, a memory 920, and input/output ports 930 operably connected by a bus 940. In one example, the computer 900 may include a block selection logic 950 to encode image data.

The block selection logic 950 provides means (e.g., hardware, stored software, firmware) for device configuration. The block selection logic 950 can be implemented similar to the apparatus 100 and 500, and/or combinations of their features. The block selection logic 950 can include logic implemented, for example, as an ASIC or other type of circuit.

Generally describing an example configuration of the computer 900, the processor 910 may be a variety of various processors including dual microprocessor and other multiprocessor architectures. A memory 920 may include volatile memory and/or non-volatile memory. Non-volatile memory may include, for example, read-only memory (ROM), programmable read only memory (PROM), erasable programmable read only memory (EPROM), electronically erasable programmable read only memory (EEPROM), and so on. Volatile memory may include, for example, random access memory (RAM), static random access memory (SRAM), dynamic random access memory (DRAM), and so on.

A disk 960 may be operably connected to the computer 900 via, for example, through an input/output interface (e.g., card, device) 970 and the input/output port 930. The disk 960 may be, for example, a magnetic disk drive, a solid state disk drive, a floppy disk drive, a tape drive, a Zip drive, a flash memory card, a memory stick, and so on. Furthermore, the disk 960 may be a compact disk read-only memory (CD-ROM) drive, a compact disk recordable (CD-R) drive, a compact disk rewritable (CD-RW) drive, a digital video disk read-only memory (DVD ROM), and so on. The memory 920 can store a process 980 and/or a data 990, for example. The disk 960 and/or the memory 920 can store an operating system that controls and allocates resources of the computer 900.

The bus 940 may be a single internal bus interconnect architecture and/or other bus or mesh architectures. While a single bus is illustrated, it is to be appreciated that the computer 900 may communicate with various devices, logics, and peripherals using other busses (e.g., peripheral component interconnect express (PCIE), 1394, universal serial bus (USB), Ethernet). The bus 940 can be types including, for example, a memory bus, a memory controller, a peripheral bus, an external bus, a crossbar switch, and/or a local bus.

The computer 900 may interact with input/output devices via the input/output (I/O) interfaces 970 including the block selection logic 950 and the input/output ports 930. Input/output devices may be, for example, a keyboard, a microphone, a pointing and selection device, cameras, video cards, displays, the disk 960, the network devices 999, and so on. The input/output ports 930 may include, for example, serial ports, parallel ports, and USB ports.

The computer 900 can operate in a network environment and thus may be connected to the network devices 999 via the I/O interfaces 970, and/or the I/O ports 930. Through the network devices 999, the computer 900 may interact with a network. Through the network, the computer 900 may be logically connected to remote computers. Networks with which the computer 900 may interact include, but are not limited to, a local area network (LAN), a wide local area network (WLAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A method, comprising:
calculating, in parallel by a hardware component, a sum of absolute differences (SAD) for each block of a set of block types, wherein each block of the set of block types is an encoding block of image data that represents at least a portion of a macroblock, and wherein the set of block types include building blocks of the macroblock and combinations of the building blocks that form complex blocks;
calculating a motion vector cost for each block of the set of block type, wherein the motion vector cost for each block is determined using an offset from a predicted motion vector, and wherein the motion vector cost for each block is calculated from a corner point of each of the plurality of blocks;
calculating a block cost for each block of the set of block types based, at least in part, on a corresponding SAD and motion vector cost;
selecting a combination of one or more blocks of the set of block types to represent the macroblock based, at least in part, on the block cost for each of the block types, wherein the combination of one or more blocks includes blocks of different sizes; and
generating compressed image data for the macroblock based on the combination.

2. The method of claim 1, wherein calculating the motion vector cost and the block cost includes calculating the motion vector cost and the block cost for each of one or more reference vectors for a block of the set of block types.

3. The method of claim 1, further comprising loading a current macroblock of image data; and extracting the set of block types from the current macroblock.

4. The method of claim 1, wherein the macroblock is an H.264 macroblock of image pixels, and wherein blocks of the set of building blocks are 4×4 arrays of sixteen pixels.

5. The method of claim 1, wherein calculating, in parallel, the sum of absolute differences (SAD) for each block of a set of block types includes calculating the sum of absolute differences for the set of block types in one clock cycle.

6. The method of claim 1, further comprising loading a reference pixel area, wherein the SAD represents a sum of absolute differences between the reference pixel area and a corresponding portion of the macroblock represented by a block from the set of block types.

7. The method of claim 1, wherein the motion vector cost depends, at least in part, on a first reference point as an offset to a predicted motion vector of a current search point.

8. The method of claim 1, wherein calculating the block cost includes calculating the block cost according to:

block cost=(lambda)×(motion vector cost)+SAD, where lambda is a scaling factor.

9. The method of claim 1, wherein the method is performed in a chip in one clock cycle and is H.264 compliant.

10. The method of claim 1, wherein the set of block types comprises forty one blocks.

11. The method of claim 1, further comprising tagging members of the set of block types, wherein the tagging allows the tagged members of the set of block types to be selected as a block of the combination.

12. The method of claim 1, further comprising storing values for the SAD accumulators, wherein there is a one to one correspondence between blocks of the set of block types and the members of the accumulators.

13. A method for encoding image data, the method comprising:
    calculating, in parallel by a hardware component, a block cost for each of a plurality of substitute blocks, wherein each of the plurality of substitute blocks represent at least a portion of a macroblock of the image data,
    wherein calculating the block cost for each of the plurality of substitute blocks includes using a plurality of predetermined cost values, wherein the plurality of predetermined cost values include a value for each pixel of the macroblock,
    wherein the predetermined cost values include a sum of absolute differences (SAD) value for each pixel and a motion vector cost for each pixel;
    selecting a combination of substitute blocks from the plurality of substitute blocks to represent the macroblock based, at least in part, on a block cost for each of the substitute blocks; and
    encoding the macroblock using the combination of substitute blocks, wherein the combination of substitute blocks includes combining substitute blocks of different sizes, wherein the motion vector cost for each of the plurality of substitute blocks is determined using an offset from a predicted motion vector, and wherein the motion vectors cost for each substitute block is calculated from a corner point of each of the plurality of substitute blocks.

14. The method of claim 13, wherein the hardware component is a plurality of accumulators, wherein calculating the block cost for each of the plurality of substitute blocks includes accumulating, in parallel in the plurality of accumulators, the predetermined cost values to calculate a block cost for each of the plurality of substitute blocks that are composed of smaller component blocks.

15. The method of claim 13, wherein selecting the combination of substitute blocks includes determining a combination of substitute blocks from the plurality of substitute blocks with a sum of block costs that are a minimum of sums of block costs among different combinations of substitute blocks of the plurality of substitute blocks.

16. The method of claim 13, wherein the set of block types comprise a set of 41 blocks, wherein calculating the block cost for each of the plurality of substitute blocks includes accumulating the block costs in a set of 41 accumulators corresponding to the set of 41 blocks, and wherein a bock cost of each block of the set of blocks corresponds to a value of one of the set of 41 accumulators.

17. An apparatus for encoding image data, the apparatus comprising:
    calculation logic configured to calculate, in parallel, a block cost for each of a plurality of substitute blocks, wherein each of the plurality of substitute blocks represent at least a portion of a macroblock of the image data,
    wherein the calculation logic is configured to calculate the block cost for each of the plurality of substitute blocks by using a plurality of predetermined cost values, wherein the plurality of predetermined cost values include a value for each pixel of the macroblock,
    wherein the predetermined cost values include a sum of absolute differences (SAD) value for each pixel and a motion vector cost for each pixel; and
    selection logic configured to select a combination of substitute blocks from the plurality of substitute blocks to represent the macroblock based, at least in part, on the block cost for each of the substitute blocks, wherein the combination is used to encode the macroblock, wherein the calculation logic is configured to determine the motion vector cost for each of the plurality of substitute blocks by using an offset from a predicted motion vector and by calculating the motion vector cost for each substitute block from a corner point of each of the plurality of substitute blocks, and wherein the combination of substitute blocks includes substitute blocks of different sizes.

18. The apparatus of claim 17, wherein the calculation logic includes a plurality of accumulators, and wherein the calculation logic is configured to calculate the block cost for each of the plurality of substitute blocks by accumulating, in parallel in the plurality of accumulators, the predetermined cost values to calculate a block cost for each of the plurality of substitute blocks that are composed of smaller component blocks.

19. The apparatus of claim 17, wherein the selection logic is configured to select the combination of substitute blocks by determining a combination of substitute blocks from the plurality of substitute blocks with a sum of block costs that are a minimum of sums of block costs among different combinations of substitute blocks of the plurality of substitute blocks.

20. The apparatus of claim 17, wherein the set of block types comprise a set of 41 blocks, wherein the calculation logic is configured to calculate the block cost for each of the plurality of substitute blocks by accumulating the block costs in a set of 41 accumulators corresponding to the set of 41 blocks, and wherein a bock cost of each block of the set of blocks corresponds to a value of one of the set of 41 accumulators.

\* \* \* \* \*